(12) United States Patent
Acosta

(10) Patent No.: US 8,573,773 B1
(45) Date of Patent: Nov. 5, 2013

(54) SWEATBAND EYEWEAR HOLDER FOR A HAT

(71) Applicant: George E Acosta, Chandler, AZ (US)

(72) Inventor: George E Acosta, Chandler, AZ (US)

( * ) Notice: Subject to any disclaimer, the term of this patent is extended or adjusted under 35 U.S.C. 154(b) by 0 days.

(21) Appl. No.: 13/898,443

(22) Filed: May 20, 2013

(51) Int. Cl.
*G02C 3/02* (2006.01)

(52) U.S. Cl.
USPC ............................................. 351/155; 24/3.3

(58) Field of Classification Search
USPC ............ 351/155, 156, 121, 158; 24/3.3, 3.12, 24/3.1, 335, 336; 248/316.7, 902
See application file for complete search history.

(56) References Cited

U.S. PATENT DOCUMENTS

| | | |
|---|---|---|
| 1,198,105 A | 9/1916 | Butler |
| 1,281,656 A | 10/1918 | Baschick et al. |
| 5,082,225 A | 1/1992 | Nespoli |
| 5,137,242 A | 8/1992 | Reath |
| 5,647,061 A | 7/1997 | Marcus |
| 5,829,103 A | 11/1998 | Allen |
| 6,647,554 B1 | 11/2003 | Yan |
| 6,668,426 B1 | 12/2003 | Morris |
| 6,691,374 B2 | 2/2004 | Coyne |
| 7,018,037 B1 * | 3/2006 | Jouver, III ..................... 351/121 |
| 7,229,172 B2 | 6/2007 | Coffey |
| 7,275,270 B2 | 10/2007 | Cotutsca |
| 7,866,813 B2 | 1/2011 | Anhalt |
| 7,954,943 B2 | 6/2011 | Ledford |
| 8,381,359 B1 | 2/2013 | McArdle |
| 2012/0272483 A1 * | 11/2012 | Moore ............................. 24/3.3 |

* cited by examiner

*Primary Examiner* — Hung Dang

(74) *Attorney, Agent, or Firm* — Mark V. Loen

(57) ABSTRACT

An embodiment of the invention is an eyewear holding clip having an inner fold, a curved surface extending from the inner fold and arching outwardly and away from the inner fold in a spiral pattern, and then slightly curving away from the inner fold to make an end. The sweatband of a hat is tucked into the inner fold of the holding clip. The fold has a certain width and then the clip narrows as it extends away from the fold.

5 Claims, 6 Drawing Sheets

SWEATBAND EYEWEAR HOLDER FOR A HAT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward an eyewear holder or clip, and, more particularly to a sunglass holder clip used to secure sunglasses to a hat, such as a baseball hat.

(2) Description of Related Art

It has become fashionable in some circles to wear sunglasses in the back of a hat for the sake of fashion and as an alternate method of wearing sunglasses when not in use. The issue of where glasses should be stored on a person when not in use is a continual problem and some people wish to be unique as to how they address this issue.

Some people use a baseball hat to store their eyewear (especially sunglasses) and place them above the brim of their hat with the stems still over their ears. A few rotate them so that the lenses are on the rear of the hat. They do not use a holding clip and instead rely on their ears and various tucking methods. This presents problems as the rearward glasses normally have no hat brim to stabilize their position. The glasses are likely to shake upwardly and downwardly when walking or moving, and, possibly fall off the hat. A clip would be helpful stabilize the position of the glasses and be designed to have adequate room for the eyewear bridge between the lenses and a stable method to secure the eyewear to the hat. Current clip designs appear to be lacking in these features for storing the eyewear when they are positioned at the rear of the hat.

Others have worked in the field of patenting holding methods or securing eyeglasses to hats such as baseball hats.

For example, U.S. Pat. No. 8,381,359 discloses a retainer clip that holds eyewear stems against the side of the hat. However, the clip lacks generous room for inserting the bridge of the glasses and the clip teeth may damage eyewear.

U.S. Pat. No. 5,647,061 discloses an eyewear holder that is unlikely to cause damage, but requires a separate headband.

U.S. Pat. No. 5,082,225 discloses a retainer clip that will attach glasses to a visor. It is lacking in a method that will conveniently and securely attach the clip to a softer material, such as a baseball hat.

U.S. Pat. No. 7,275,270 is a method for attaching eyewear stems to the side of a baseball hat. It does not disclose suitable methods for securing the eyewear bridge to a hat, and requires that it be a relatively permanent attachment to the hat.

BRIEF SUMMARY OF THE INVENTION

A preferred embodiment of the invention is an eyewear holding clip having an inner fold, a curved surface extending from the inner fold and arching outwardly and away from the inner fold in a spiral pattern, and then slightly curving away from the inner fold to make an end. The eyewear holding clip is attached to a hat by utilizing the sweatband of the hat and tucking the sweatband into the inner fold of the holding clip. The fold is the widest part of the eyewear holding clip and then the clip narrows as it extends away from the fold.

An advantage of this embodiment is that the holding clip is securely attached to the hat and therefore securely attaches the eyewear to the hat when the eyewear is properly secured inside the clip. Another advantage is that the clip may be worn anywhere in the hat where it is convenient, but preferably in the back of the hat where the glasses are worn unfolded, upside down, and easily pulled off the clip and placed into the proper position over the bridge of the nose. One or two hands may be used when moving the eyewear from the rear of the hat to the normal seeing position.

BRIEF DESCRIPTION OF THE SEVERAL VIEWS OF THE DRAWING(S)

The object of the apparatus is to securely hold eyewear on the rear of a hat, particularly sunglasses that are secured to a baseball hat, so as to allow the wearer convenient access to the eyewear. The apparatus accomplishes this by securely attaching to the headband or sweatband of the hat and bridge of the eyewear and without touching the eyewear lenses. It is then relatively convenient to grasp the eyewear with both hands and remove the eyewear from the clip and put in place for use in one simple, smooth, intuitive motion. The apparatus securely holds the eyewear to the hat even if there is motion by the wearer.

FIG. 1 shows an isometric view of the eyewear retainer clip.

FIGS. 2A-B show a center view of the eyewear retainer clip, along with left, right, top, and bottom views.

DETAILED DESCRIPTION OF THE INVENTION

Figure 1:
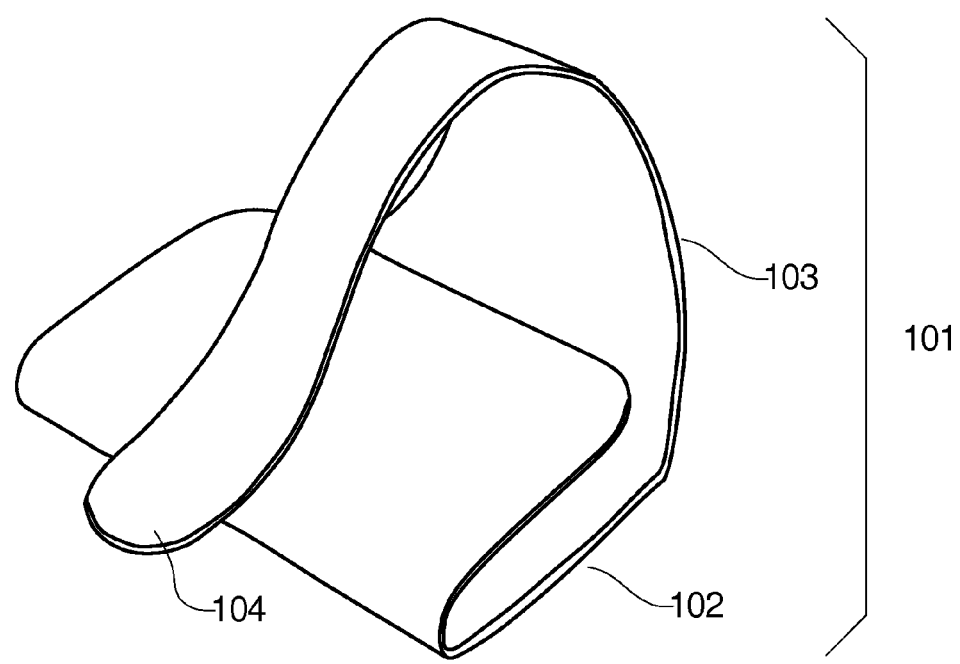

As seen in FIG. 1, the eyewear retainer clip 101 is shown in isometric view. The parts can be described visually as an inner fold 102, an arch 103 attached to the inner fold, and a tip 104.

Figure 2A:
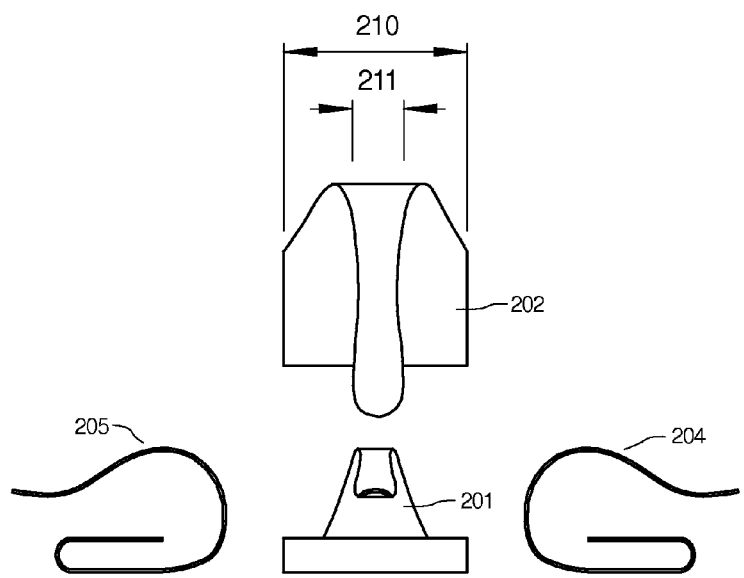
Figure 2A:
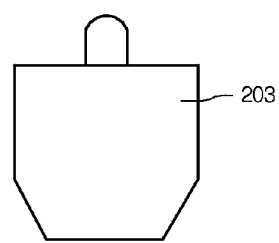

FIG. 2A shows a center view 201 of the eyewear retainer clip, along with left view 205, right view 204, top view 202, and a bottom view 203. The eyewear retainer clip may be made from a suitable metal, plastic, or a combination of the two. A logo may be added to the arch and tip. It may be colored and textured. If it is made from metal, it is preferably folded into shape. If it is plastic, it may be hot folded or made from an injection machine. In general, a uniform thickness is used, but this is not a strict requirement. The arch and tip may be a different thickness than the fold if it is a plastic material and made from an injection molding process.

The fold is the widest part of the eyewear holding clip and then the clip narrows as it extends away from the fold. The fold is designed to allow a headband to be inserted into the middle. When the hat is worn, the headband and holding clip are pressed together and this further secures the retainer clip against the wall of the hat when the hat is reasonably fitting the head of the wearer. The use of a wide fold is a preferred embodiment and provides a secure attachment without damage to the hat. The fold width 210 is preferably between 1 to 2 inches inclusive. This is a good width for stability when inserted into a hat. The arch width from the tip to the beginning arch point 211 is preferably ⅜" wide and narrower. Widths much greater than that amount are likely to have a reduced number of glasses where the arch will fit on the bridge of the glasses.

Figure 2B:

FIG. 2B shows the definition of the different surfaces by an end view. The tip 211 is attached to the arch 212 which is then attached to the fold 213. The tip and arch surfaces are distinguished by a line that is defined where the curve inflects or changes direction. The fold ends when the parallel surface above it begins due to the overall spiral nature of the design. In a preferred embodiment, the two main surfaces of the fold are parallel. In another embodiment, the two surfaces of the fold are not exactly flat or parallel due to the nature of manufacture. They are only two roughly straight surfaces, depending upon the manufacturing method. Creating the fold portion of the apparatus by using heat and plastic, for example, starting with a flat plastic may cause the fold to be slightly curved and still create an acceptable visual and usable product.

Figure 3A:
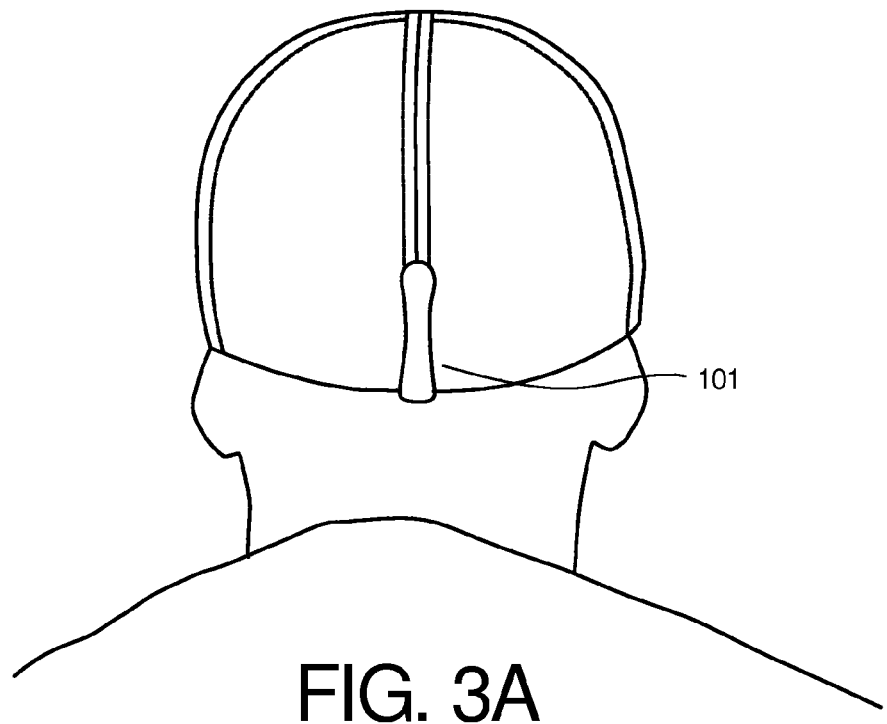
FIGS. 3A-3B shows the eyewear retainer clip in place on the back of a baseball hat.
Figure 3B:
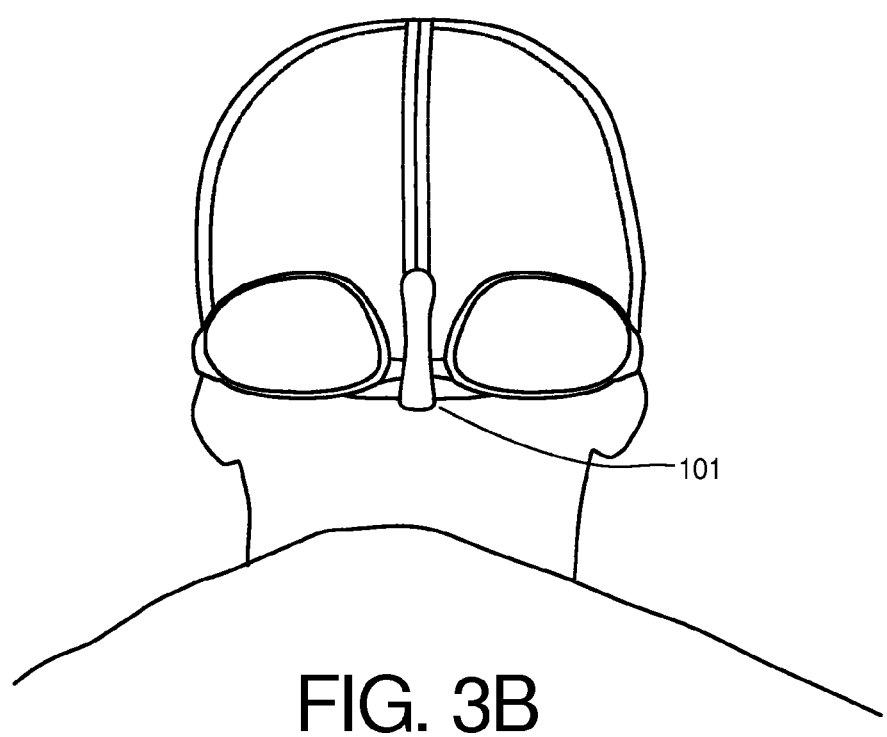
Figure 4A:
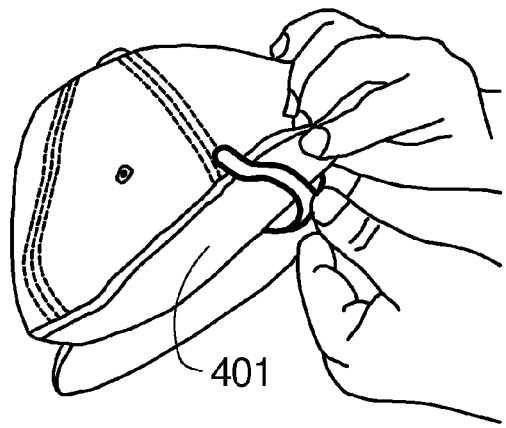
FIGS. 4A-4D shows how the eyewear retainer clip is inserted into the rear sweatband of a baseball hat.
Figure 4C:
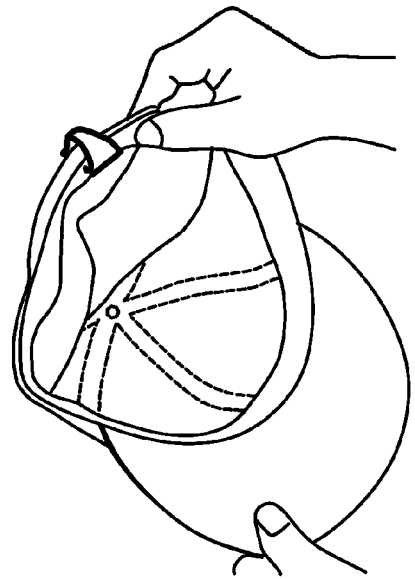
Figure 4B:
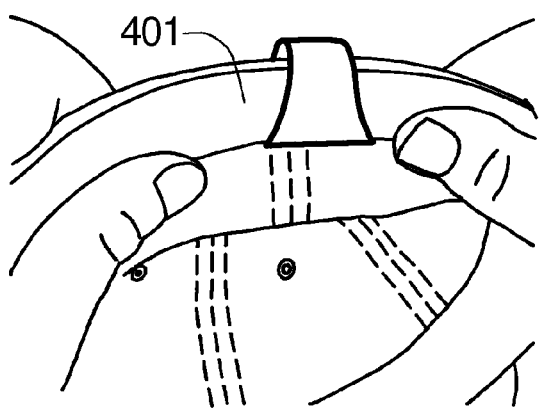
Figure 4D:
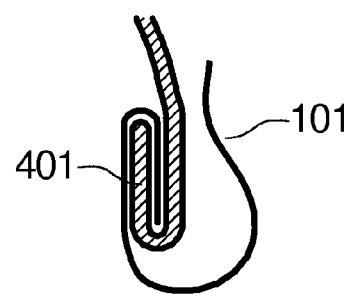

FIG. 3A shows how the eyewear retainer clip 101 would look when in place on the back of a baseball hat. Only the arch and tip of the retainer clip would be visible. The inner fold would be tucked into the sweat band. FIG. 3B shows eyewear inserted into the arch of the eyewear retainer clip where it is held in place FIG. 4A-4C shows how the eyewear retainer clip is inserted into the rear sweatband of a baseball hat. FIG. 4A shows how the eyewear retainer clip is first inserted onto the sweatband which is folded out. FIG. 4B shows how the eyewear retainer clip is now installed onto the sweatband where the sweatband 401 is now inside the inner fold of the retainer clip 101 as shown in FIG. 4D. FIG. 4C shows the baseball cap ready to be inserted onto the head of the wearer.

Figure 5:
FIG. 5 shows a typical embodiment of how eyewear is worn on the hat.

FIG. 5 shows an embodiment of how the eyewear glasses are worn on the hat with the stems forward and the glass lenses on the rear of the hat.

Figure 6:
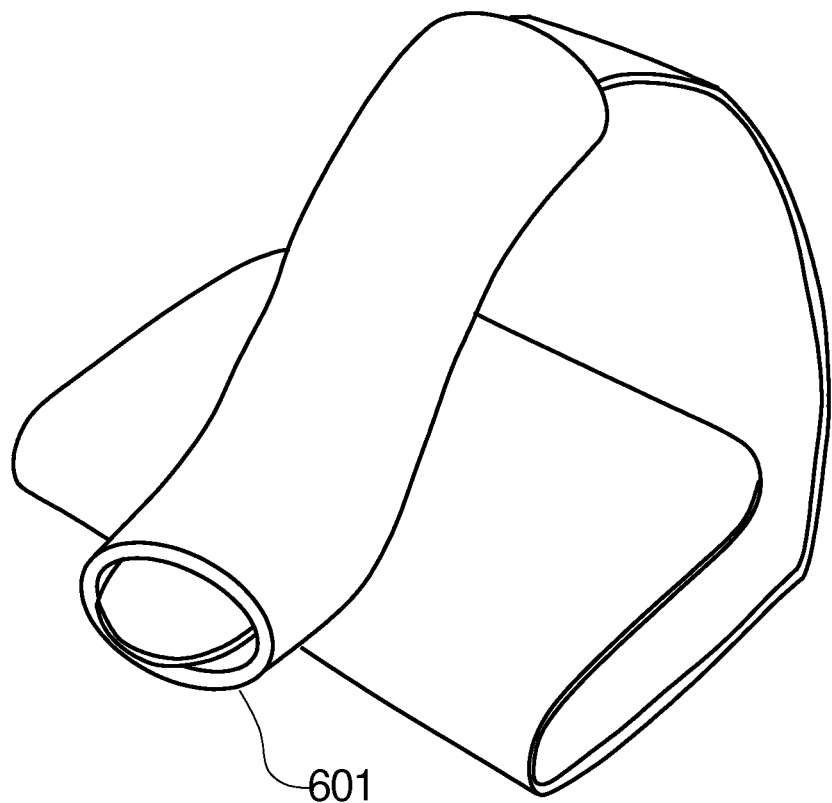
FIG. 6 shows an alternate embodiment where padding is added to the eyewear retainer clip.

FIG. 6 shows an embodiment where padding 601 is added to the eyewear retainer clip. It should also be mentioned, that padding does not need to be added if the arch and tip are re-designed to incorporate the cylindrical shape the padding presents to the eyewear. The arch and tip may be curled or thickened in a manner that provides a similar rounded contact with the eyewear even if the contact is not softened with padding. Functionally, only the parts that contact the eyewear need to be modified in this manner: the arch and tip. The fold, for example, may remain flat and unpadded so that it fits into the hat.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. An eyewear retainer clip for holding eyewear to a headband in a hat comprising:
   A) a spiral shaped body comprising:
      1) an inner fold comprising:
         a) two flat rectangular surfaces,
         b) an arc, and
         c) wherein said two flat rectangular surfaces are joined together by said arc and separated by a distance defined by said arc,
      2) an arch,
      3) a tip, and
      4) wherein said arch is attached to said inner fold and said tip is attached to said arch,
   B) wherein said separation between said two flat rectangular surfaces is designed to receive said headband,
   C) wherein said arch is designed to hold said eyewear, and
   D) wherein said arch encompasses the bridge of said eyewear when said eyewear is worn upside down on the rearward area of said hat.

2. The eyewear retainer clip according to claim 1 wherein said headband is a sweatband.

3. The eyewear retainer clip according to claim 1 wherein said tip has a width of three eights of an inch or narrower.

4. The eyewear retainer clip according to claim 1 wherein said fold has a width of between 1 and 2 inches inclusive.

5. The eyewear retainer clip according to claim 1 wherein said arch and said tip are a curved surface.

\* \* \* \* \*